US012669287B2

(12) United States Patent
Lineen

(10) Patent No.: US 12,669,287 B2
(45) Date of Patent: Jun. 30, 2026

(54) MOLYBDENUM-LINED CRUCIBLE

(71) Applicant: X-ENERGY, LLC, Rockville, MD (US)

(72) Inventor: Nick Lineen, Knoxville, TN (US)

(73) Assignee: X-Energy, LLC, Rockville, MD (US)

( * ) Notice: Subject to any disclaimer, the term of this patent is extended or adjusted under 35 U.S.C. 154(b) by 533 days.

(21) Appl. No.: 18/317,627

(22) Filed: May 15, 2023

(65) Prior Publication Data

US 2024/0384934 A1 Nov. 21, 2024

(51) Int. Cl.
F27B 14/10 (2006.01)
C01G 43/01 (2006.01)
(Continued)

(52) U.S. Cl.
CPC .............. F27B 14/10 (2013.01); C01G 43/01 (2013.01); F27B 7/26 (2013.01); F27B 7/28 (2013.01);
(Continued)

(58) Field of Classification Search
CPC ...... F27B 7/26; F27B 2007/365; F16C 3/023; F16C 2204/42; F16C 2204/46; F16C 2226/60; F16C 2362/40; F27D 1/1808; F27D 2099/0083; F27D 2099/0098; C21B 13/08
See application file for complete search history.

(56) References Cited

U.S. PATENT DOCUMENTS 3,328,017 A * 6/1967 Conner ................... F27B 14/12
266/280
5,443,892 A 8/1995 Holcombe
(Continued)

FOREIGN PATENT DOCUMENTS

CN 2061266 U 8/1990
CN 101450869 A 6/2009
(Continued)

OTHER PUBLICATIONS

MD_Metals_understanding_volume_and_weight_in_metal_estimation_2024.pdf (Year: 2024).*
(Continued)

*Primary Examiner* — Michael G Hoang
*Assistant Examiner* — Kurt J Wolford
(74) *Attorney, Agent, or Firm* — Kramer & Amado, P.C.

(57) ABSTRACT

A crucible used for forming ceramic particles from metal oxide gel particles includes a tubular graphite housing having an open end, an inner surface, and a seat in the inner surface near the open end. A sleeve lines the inner surface of the tubular housing. The sleeve has at an open end and is formed from a metal which is chemically inert to the metal oxide gel particles. A graphite outer cap removably covers the open end of the tubular housing. An inner cap formed from the chemically inert metal fits into the seat in the inner surface of the tubular housing, and is pressed into the seat against the open end of the sleeve by the outer cap. The crucible may be used for forming ceramic particles from uranium oxide gel particles, and the sleeve and the inner cap may be formed from molybdenum, tungsten, or an alloy thereof.

17 Claims, 11 Drawing Sheets

(51) Int. Cl.

| | |
|---|---|
| *F27B 7/26* | (2006.01) |
| *F27B 7/28* | (2006.01) |
| *F27B 14/12* | (2006.01) |

(52) U.S. Cl.

CPC ........ *F27B 14/12* (2013.01); *F27B 2014/104* (2013.01)

(56) References Cited

U.S. PATENT DOCUMENTS

| | | | |
|---|---|---|---|
| 6,770,136 | B2 | 8/2004 | Kuhn |
| 7,790,101 | B2 | 9/2010 | Kelly |

FOREIGN PATENT DOCUMENTS

| | | | | | |
|---|---|---|---|---|---|
| CN | 202421015 | U | | 9/2012 | |
| CN | 10604821 | A | | 2/2017 | |
| CN | 109405544 | A | * | 3/2019 | ............... B01L 3/04 |
| CN | 109475929 | A | | 3/2019 | |
| CN | 110886014 | A | | 3/2020 | |
| CN | 112210666 | A | | 1/2021 | |
| CN | 218627726 | U | | 3/2023 | |
| CN | 116026143 | A | | 4/2023 | |
| GB | 1157863 | A | | 7/1969 | |
| JP | 2015-013758 | A | | 1/2015 | |
| JP | 2016132602 | A | * | 7/2016 | ............ C01B 32/05 |
| KR | 101644096 | B1 | | 7/2016 | |
| KR | 10-2017-0138228 | A | | 12/2017 | |
| WO | 2013174229 | A1 | | 11/2013 | |

OTHER PUBLICATIONS

CN-109405544-A translation (Year: 2025).*

JP-2016132602-A translation (Year: 2025).*

* cited by examiner

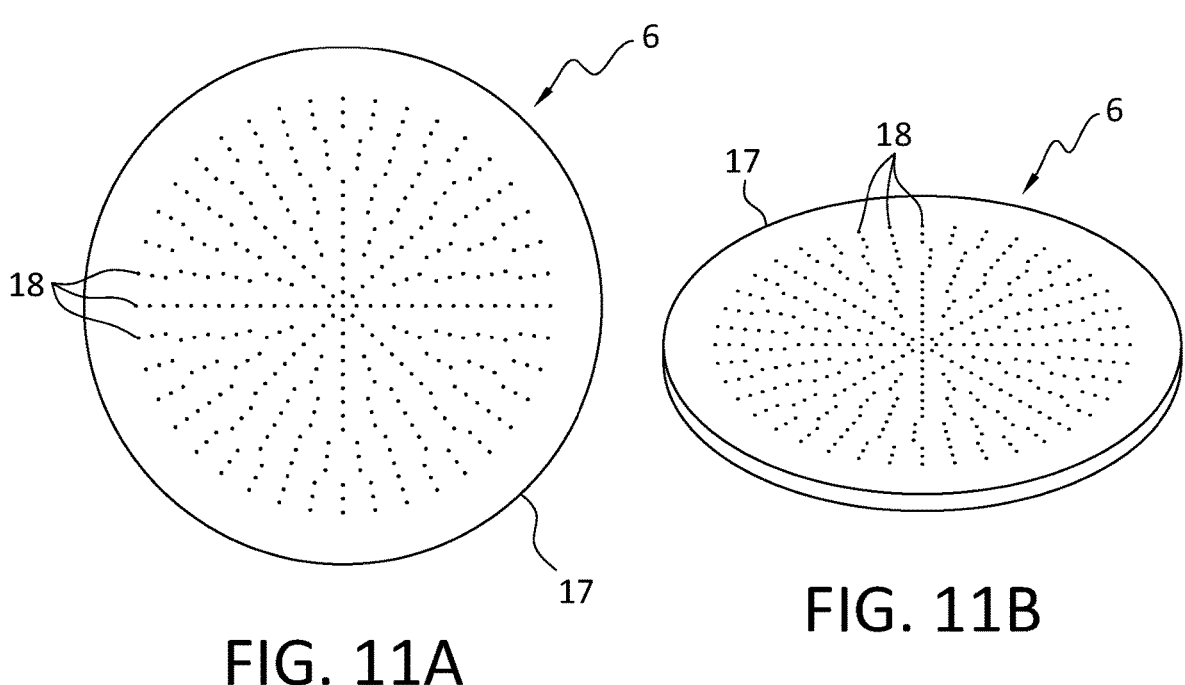
FIG. 11A
FIG. 11B
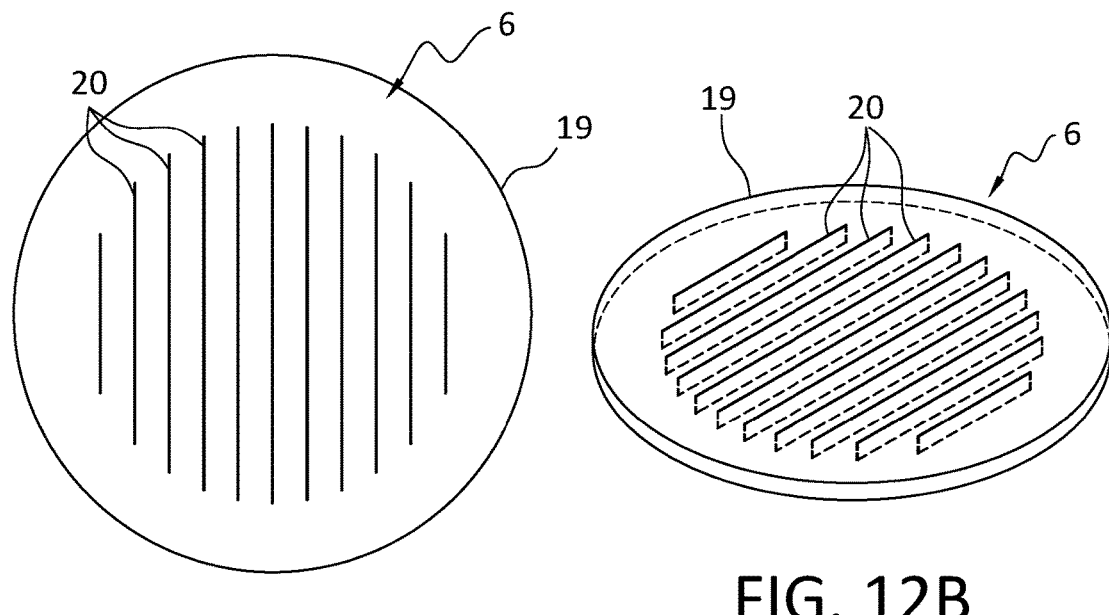
FIG. 12A
FIG. 12B

MOLYBDENUM-LINED CRUCIBLE

TECHNICAL FIELD

Various embodiments disclosed herein relate generally to a reactor for sintering metal oxide gel particles, such as a crucible for sintering metal oxide gel particles.

BACKGROUND

During sintering of uranium oxide gel particles for the production of uranium oxide, uranium carbide, and/or uranium oxycarbide fuel kernels, it is important that the crucible is chemically stable with the oxides, carbides, and oxycarbides of uranium at temperatures up to 1800° C. In the past, crucibles made of graphite, tungsten, or tantalum have been used for sintering uranium oxide gel particles, alone or in the presence of a carbon source. However, these materials may not be chemically stable with regard to uranium oxide particles. For example, graphite reacts with uranium dioxide particles to produce a layer of $UC_2$ at the particle surface. This may also allow uranium to leach into the inner surface of the graphite crucible.

Molybdenum metal has the greatest chemical stability to uranium oxides and carbides at extreme temperatures, and is the material of choice for production of uranium-based ceramic fuel kernels. However, molybdenum is heavy and will also carburize in the presence of graphite and often form strong welds when in contact with graphite at to temperatures greater than 1700° C. Furthermore, the crucible has to allow significant gas flow to allow reactive processing gases produced during the sintering step to be vented from the crucible, while also preventing the escape of kernels from the crucible.

In view of the foregoing, it would be desirable to have an improved crucible for reaction of metal oxide gel particles, including uranium oxide gel particles. The crucible should be light, easily loaded, chemically and thermally stable to the metal oxide gel particles, and allows sufficient gas flow.

SUMMARY

In light of the present need for improved crucibles for sintering metal oxide gel particles, a brief summary of various embodiments is presented. Some simplifications and omissions may be made in the following summary, which is intended to highlight and introduce some aspects of the various exemplary embodiments, but not to limit the scope of the invention. Detailed descriptions of certain embodiments adequate to allow those of ordinary skill in the art to make and use the concepts disclosed herein will follow in later sections.

Various embodiments disclosed here relate to a crucible for forming ceramic particles from metal oxide gel particles, including a tubular housing formed of graphite having at least one open end, an inner surface, and a seat in the inner surface near the at least one open end; and a sleeve lining the inner surface of the tubular housing, wherein the sleeve has at least one open end and is formed from a metal which is chemically inert with regard to the metal oxide gel particles. A graphite outer cap removably covers the at least one open end of the tubular housing. An inner cap formed from the chemically inert metal is configured to fit into the seat in the inner surface of the tubular housing. The outer cap is configured to press the inner cap into the seat against the open end of the sleeve.

The inner cap and the outer cap may be configured to allow gases to escape from within the crucible. The inner cap may be configured to allow gases to pass therethrough, and the outer cap may include an axial hole therethrough, where gases passing through the inner cap may escape through the axial hole in the outer cap. In various embodiments, the inner cap includes at least one hole therethrough, the at least one hole being smaller than 50% of the mean particle size of a collection of metal oxide gel particles in the crucible. The inner cap may include at least one slit therethrough, the width of the at least one slit being smaller than 50% of the mean particle size of the metal oxide gel particles.

In various embodiments, the crucible may also include a compressible carbon fiber felt, wherein the compressible carbon fiber felt is configured to be compressed against the inner cap by the outer cap.

The crucible may also include a graphite ring with an outer seat, wherein the outer seat is configured to engage an edge of the inner cap, and the graphite ring is configured to be pressed against the edge of the inner cap by the outer cap.

The crucible may include:

a graphite ring with an outer seat, wherein the outer seat is configured to engage an edge of the inner cap, and a ring of compressible carbon fiber felt, wherein the ring of compressible carbon fiber felt is configured to be compressed against the graphite ring by the outer cap.

In various embodiments, the crucible is configured to rotate about an axis thereof, where the crucible further comprises a rotatable drive shaft configured to engage the outer cap. The rotatable drive shaft may include a polygonal end, and the outer cap may include a polygonal socket configured to engage the polygonal end of the rotatable drive shaft. The rotatable drive shaft may include a bore therethrough, and the outer cap may include a hole therethrough, where the bore in the rotatable drive shaft and the hole in the outer cap are configured to provide a pathway to allow gases to escape from within the crucible.

In various embodiments, the crucible is configured to rotate about an axis thereof, where the crucible further comprises a rotatable drive shaft configured to engage the outer cap. The rotatable drive shaft may include a polygonal end, and a hemispherical ball extending from the polygonal end of the rotatable drive shaft. The outer cap may include a socket configured to receive the polygonal end of the rotatable drive shaft, wherein the socket includes an inner hemispherical socket configured to engage the hemispherical ball of the rotatable drive shaft; and an outer polygonal socket configured to engage the polygonal end of the rotatable drive shaft. The rotatable drive shaft may include a bore therethrough, and the outer cap may include a hole therethrough, where the bore in the rotatable drive shaft and the hole in the outer cap are configured to provide a pathway to allow gases to escape from within the crucible.

Various embodiments disclosed herein relate to a crucible for forming ceramic uranium-containing particles from uranium oxide gel particles, including a tubular housing formed of graphite having at least one open end, an inner surface, and a seat in the inner surface near the at least one open end; and a sleeve lining the inner surface of the tubular housing, wherein the sleeve has at least one open end. An outer cap removably covers the at least one open end of the tubular housing. An inner cap may be configured to fit into the seat in the inner surface of the tubular housing; and the outer cap may be configured to press the inner cap into the seat against the open end of the sleeve. The sleeve and the inner cap may be formed from molybdenum. The sleeve and the inner cap may be formed from a molybdenum alloy comprising 0.5% titanium, 0.08% zirconium, 0.02% carbon, or a mixture thereof.

BRIEF DESCRIPTION OF THE DRAWINGS

In order to better understand various exemplary embodiments, reference is made to the accompanying drawings, wherein:

FIGS. 11A and 11B illustrate a second embodiment of an inner cap for use in the crucible of FIG. 1;

FIGS. 12A and 12B illustrate a third embodiment of an inner cap for use in the crucible of FIG. 1;

DETAILED DESCRIPTION

Figures 1, 2A:
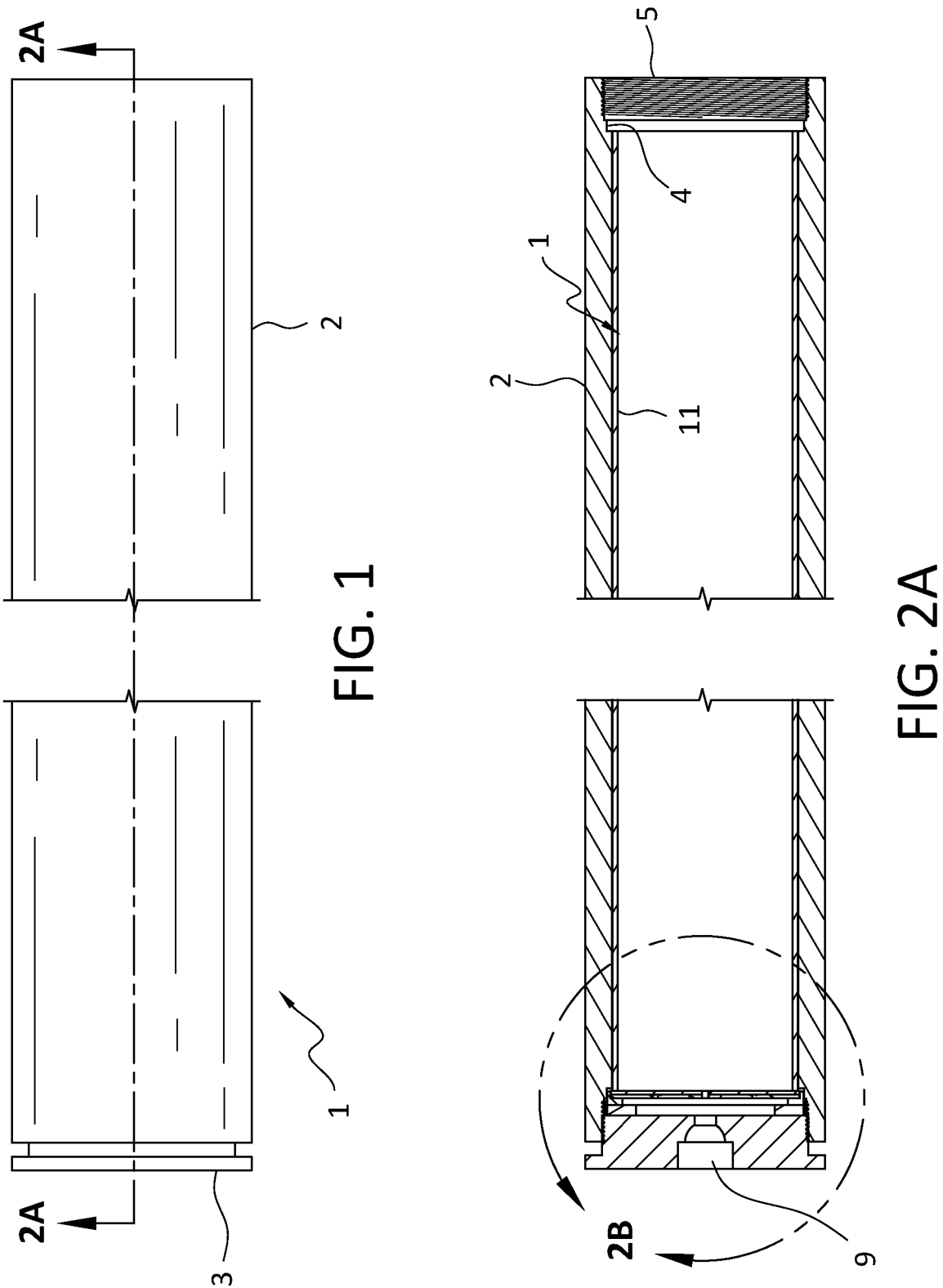
FIG. 1 illustrates a crucible for forming ceramic particles from metal oxide gel particles, where one end is sealed by an outer cap and one end is open.
FIG. 2A illustrates a cross section of the crucible of FIG. 1, viewed in the direction of arrows A of FIG. 1.

Referring now to the drawings, in which like numerals refer to like components or steps, there are disclosed broad aspects of various exemplary embodiments.

FIG. 1 shows a crucible 1 according to the present disclosure, including a tubular housing 2 formed of graphite. The housing has an open end covered by a removable outer cap 3, also formed of graphite. The opposite end may also be open, or the opposite end may be closed. If the opposite end is open, it may be covered by a second removable cap 3 (not shown in FIG. 1). Outer cap 3 is screwed onto threading 5, as shown in FIG. 2A.

FIG. 2A shows a cross section of the crucible 1 of FIG. 1. In this cross section, each end of the tubular housing 2 is open. A seat 4 is machined into the inner surface of each end of the tubular housing 2. Helical threading 5 is machined into the inner surface of each end of the tubular housing 2, where helical threading 5 is between seat 4 and the rim of the open end of tubular housing 2. A socket 9 is machined into outer cap 3. Socket 9 is intended to engage a rotatable shaft, in a manner which will be discussed later. The inner surface of the tubular housing is lined with a metal sleeve 11.

Selection of the metal for sleeve 11 is dependent on the nature of the metal oxide gel particles to be sintered in crucible 1, as the metal for sleeve 11 must be chemically inert to the metal oxide gel particles to be sintered. In various embodiments, the metal oxide gel particles may be uranium oxide gel particles. In such cases, the metal for sleeve 11 may be molybdenum, tungsten, or an alloy thereof. A suitable molybdenum alloy contains 0.5% titanium, 0.08% zirconium, 0.02% carbon, or a mixture thereof. TZM alloy, including 0.5% titanium, 0.08% zirconium, 0.02% carbon, and a balance of molybdenum, may be used.

The sleeve 11 may be 0.5 to 5 mm thick, 1 to 4 mm thick, or 2 to 3 mm thick. The sleeve 11 may be machined from a solid rod of the desired metal, e.g., a solid rod of molybdenum, tungsten, or TZM alloy. A sheet of the desired metal may be formed into a cylinder, with the opposed edges of the sheet being crimped together to form a tubular sleeve 11. A metal foil may be used to line housing 2 with a layer of the desired metal. The inner surface of housing 2 may be coated with tungsten or molybdenum by chemical vapor deposition using $WF_6$. $Mo(CO)_6$, or other compounds known in the art as metal precursors. For purposes of this disclosure, the term "sleeve" will be interpreted as encompassing tubular sheets or foils, as well as CVD coating layers.

Figure 2B:
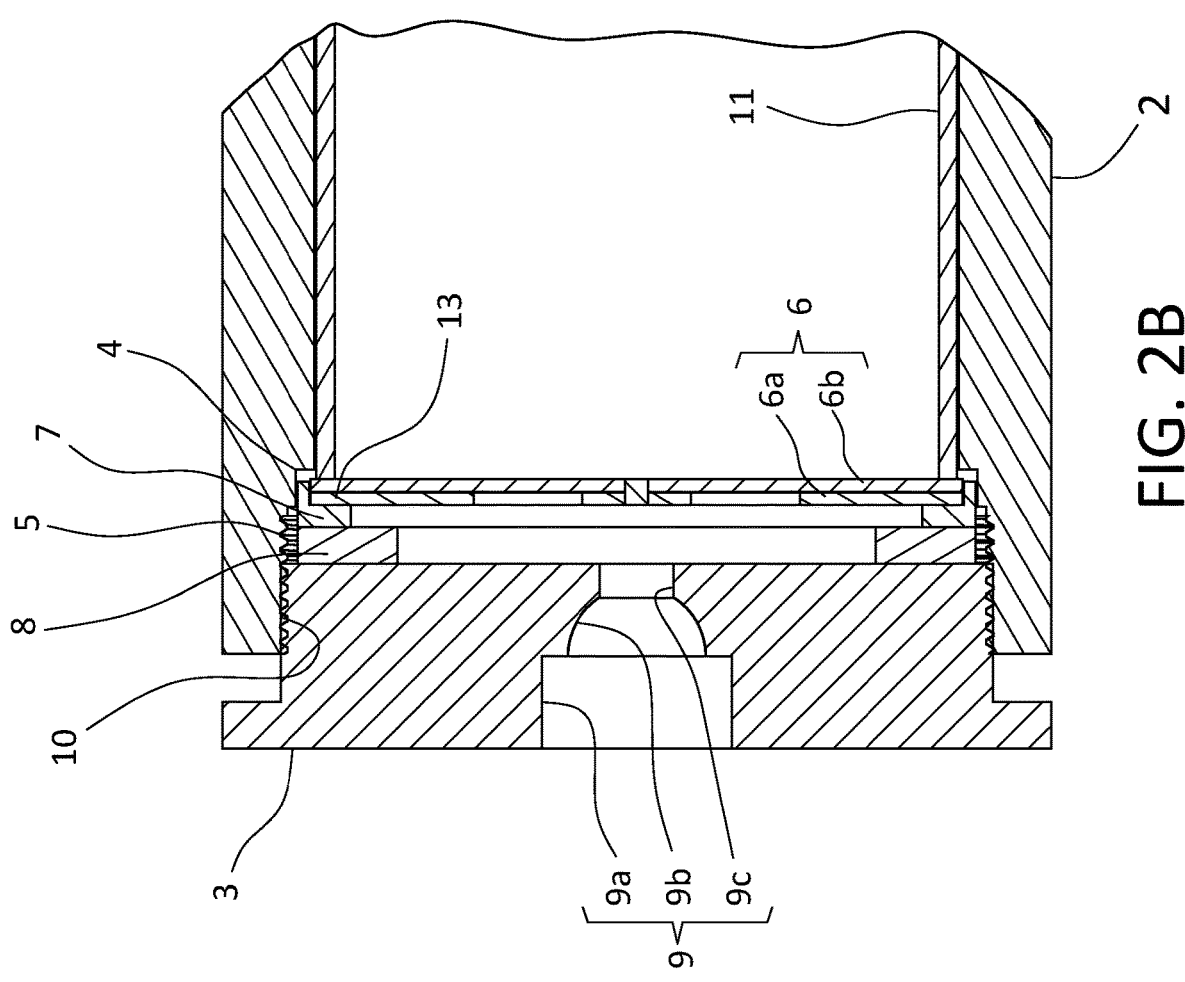
FIG. 2B illustrates a detail of the cross section of FIG. 2A, showing the outer cap and the inner cap.

FIG. 2B is a detail of one end of the cross section of crucible 1 of FIG. 2A. As seen in FIG. 2B, a sleeve 11 lines the inner surface of tubular housing 2 of crucible 1. An inner cap 6 is formed from two metal plates, an outer plate 6a and an inner plate 6b. The edge of inner cap 6 is positioned within seat 4 of housing 2. A graphite ring 7 includes a seat 13 which engages the edge of inner cap 6. Graphite ring 7 presses the inner cap 6 into seat 4, against an edge of sleeve 11. A ring or disc 8 of a compressible carbon fiber felt or graphite mesh is positioned against graphite ring 7. Finally, outer cap 3 is screwed onto the open end of housing 2, where a threaded outer surface 10 on outer cap 3 engages the helical threading 5 in the inner surface of the tubular housing 2. Outer cap 3 presses the carbon fiber felt ring or disc 8, the graphite ring 7, and the inner cap 6 against the end of sleeve 11. When metal oxide gel particles are placed in crucible 1 and the open end(s) of housing 2 are sealed with the outer cap(s) 3, the metal oxide gel particles only contact the metallic sleeve 11 and the metallic inner cap 6, and do not contact the graphite housing 2 or the graphite outer cap 3. This prevents undesired reactions between metal oxide gel particles and graphite.

The carbon fiber felt ring or disc 8 is present to prevent damage to tubular housing 2 or outer cap 3 from thermal expansion of the metal sleeve 11. In the absence of the carbon fiber felt ring or disc 8, thermal expansion of sleeve 11 may lead to cracking or other damage to housing 2 or cap 3, as sleeve 11 within housing 2 is unable to expand against cap 3. However, if carbon fiber felt ring or disc 8 is present, carbon fiber felt ring or disc 8 is able to compress as sleeve 11 expands longitudinally within housing 2 toward cap 3. This relieves stresses on housing 2 and cap 3 from expansion of sleeve 11.

Figure 3:
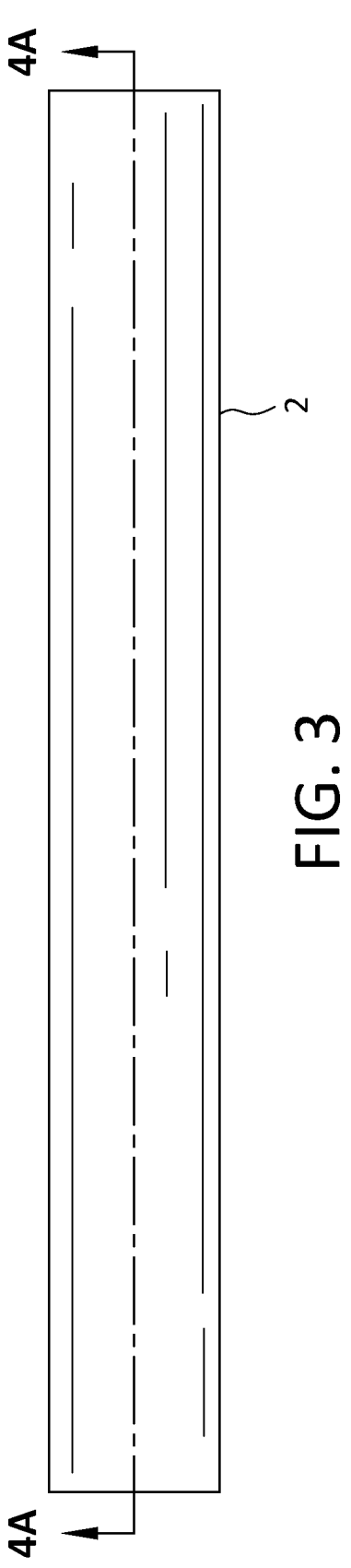
FIG. 3 illustrates a tubular shell for use in the crucible of FIG. 1.

FIG. 3 shows the graphite tubular housing 2 as used in crucible 1 according to the present disclosure. Graphite tubular housing 2 has at least one open end (not shown in FIG. 3). Graphite tubular housing 2 may have a single open end at one end of housing 2, and a closed end at the opposite end of housing 2. Graphite tubular housing 2 may have two open ends, one at each end of housing 2.

Figure 4A:
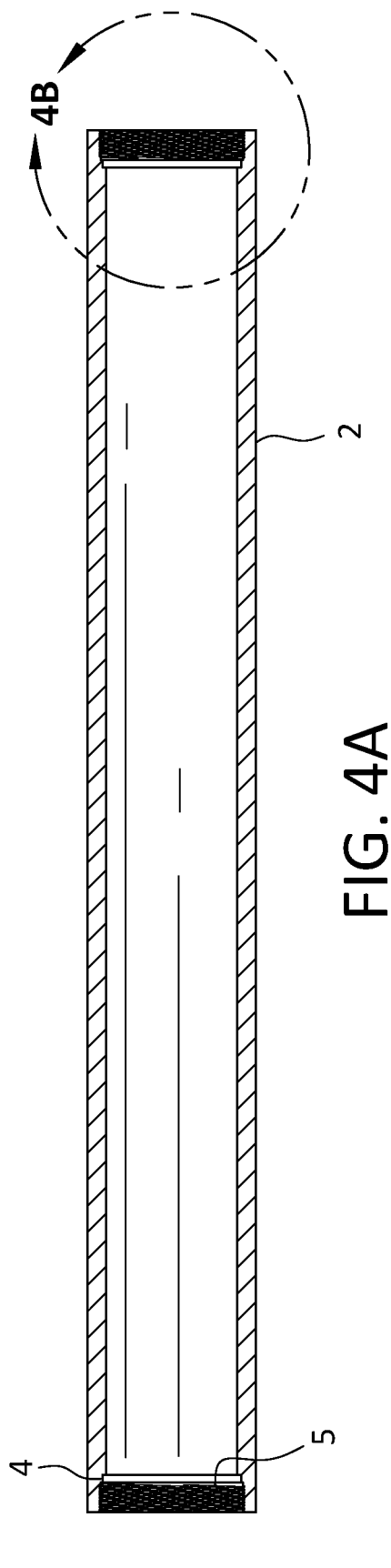
FIG. 4A illustrates a cross section of the tubular shell of FIG. 3, viewed in the direction of arrows D of FIG. 3.
Figure 4B:
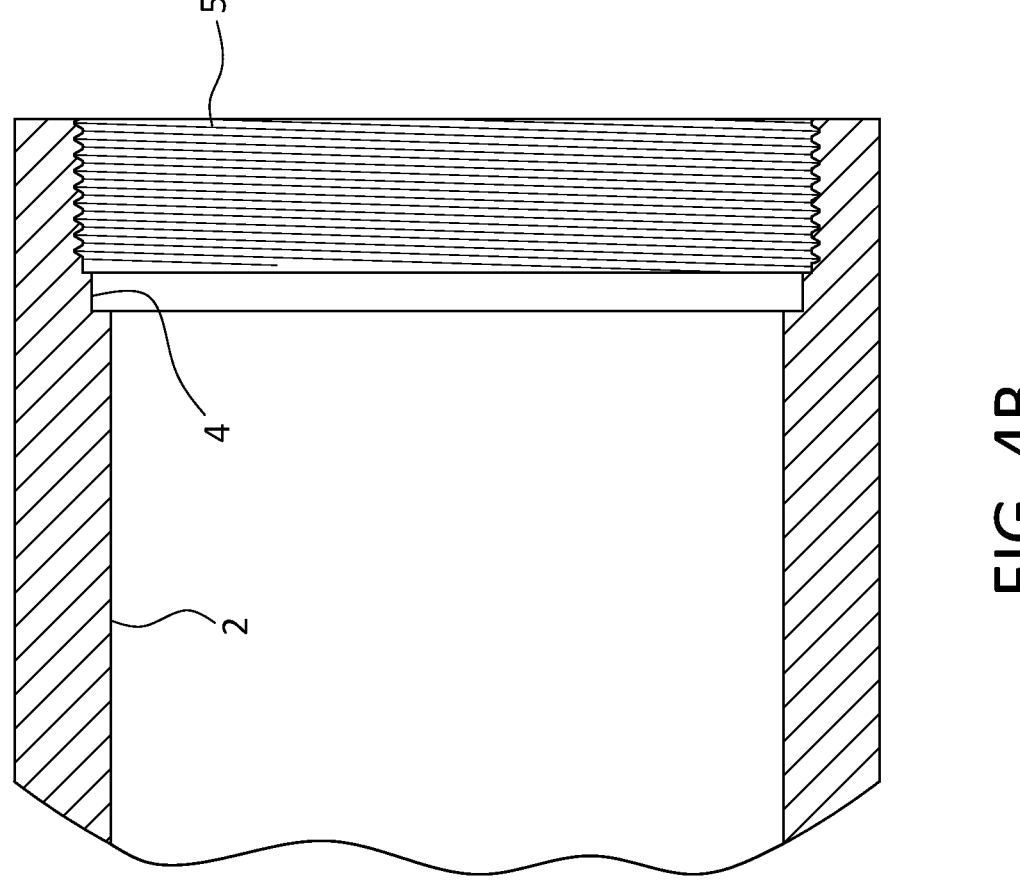
FIG. 4B illustrates a detail of the cross section of FIG. 4A.

FIG. 4A shows a cross section of the graphite tubular housing 2, where the cross section is along a plane containing an axis of housing 2 as shown by arrows D in FIG. 3. The embodiment of graphite tubular housing 2 shown in FIG. 4A has two open ends. Each end of the tubular housing 2 has a seat 4 machined into the inner surface of each end of the tubular housing 2. Helical threading 5 is machined into the inner surface of each end of the tubular housing 2, where helical threading 5 is between seat 4 and the rim of the open end of tubular housing 2. FIG. 4B shows a detail view of one open end of the graphite tubular housing 2, including seat 4 and threading 5.

Figures 5, 6:
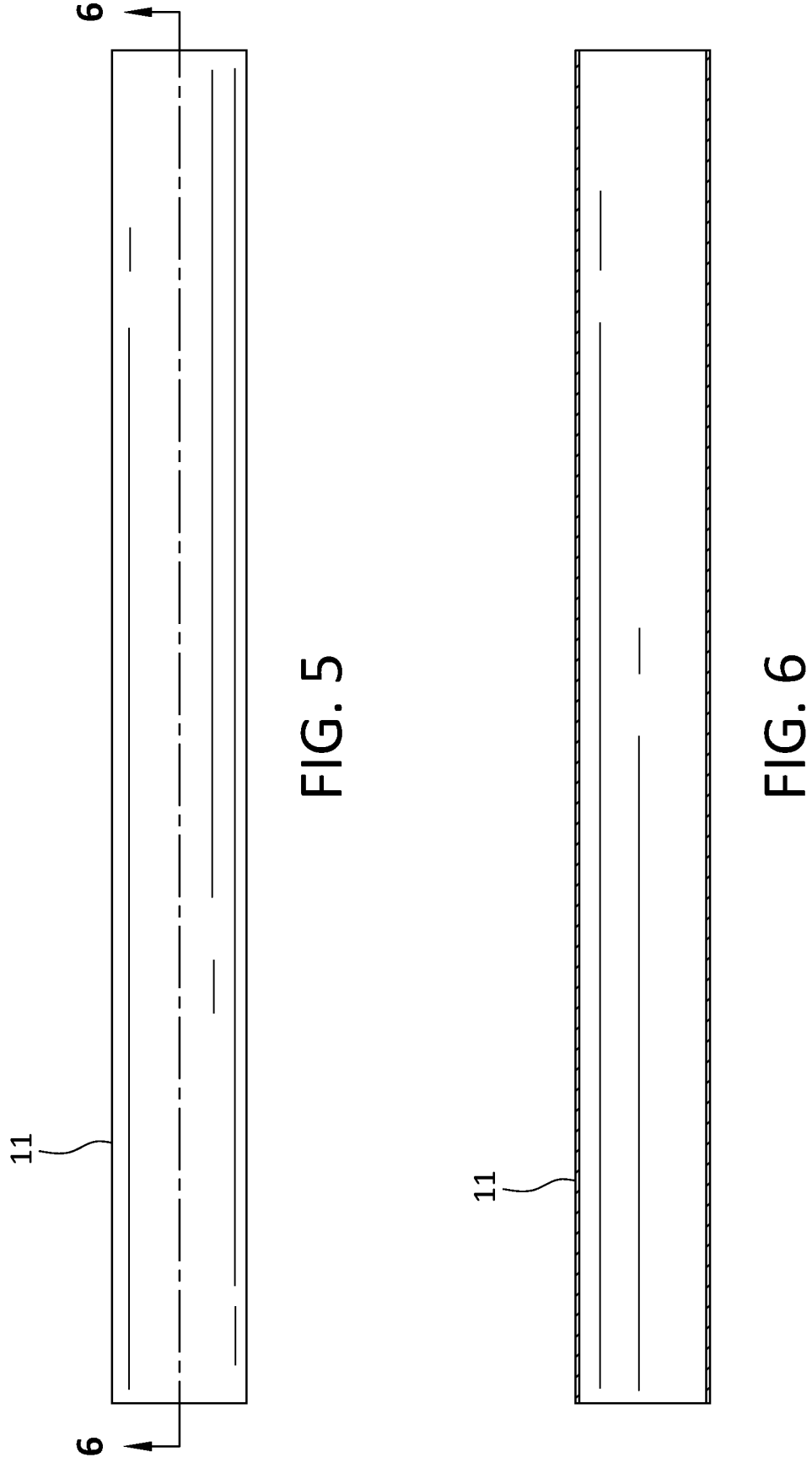
FIG. 5 illustrates a sleeve for use in the crucible of FIG. 1.
FIG. 6 illustrates a cross section of the sleeve of FIG. 5, viewed in the direction of arrows C of FIG. 5.

FIG. 5 shows the tubular sleeve 11, which has an outer diameter sized so as to allow sleeve 11 to slide longitudinally into the housing 2 of FIG. 3. FIG. 6 shows a cross section of the tubular sleeve 11, where the cross section is along a plane containing an axis of sleeve 11, as shown by arrows C in FIG. 5. Sleeve 11 has at least one open end. Sleeve 11 may have a single open end at one end of sleeve 11, and a closed end at the opposite end of sleeve 11. Sleeve 11 may have two open ends, one at each end of sleeve 11, as shown on FIG. 6. If the sleeve 11 has a single open end, it should slide longitudinally into the housing 2 of FIG. 3 so that the open end of sleeve 11 is positioned at an open end of housing 2.

Figures 7A, 7B, 8A, 8B, 9A, 9B, 10A, 10B, 10C:
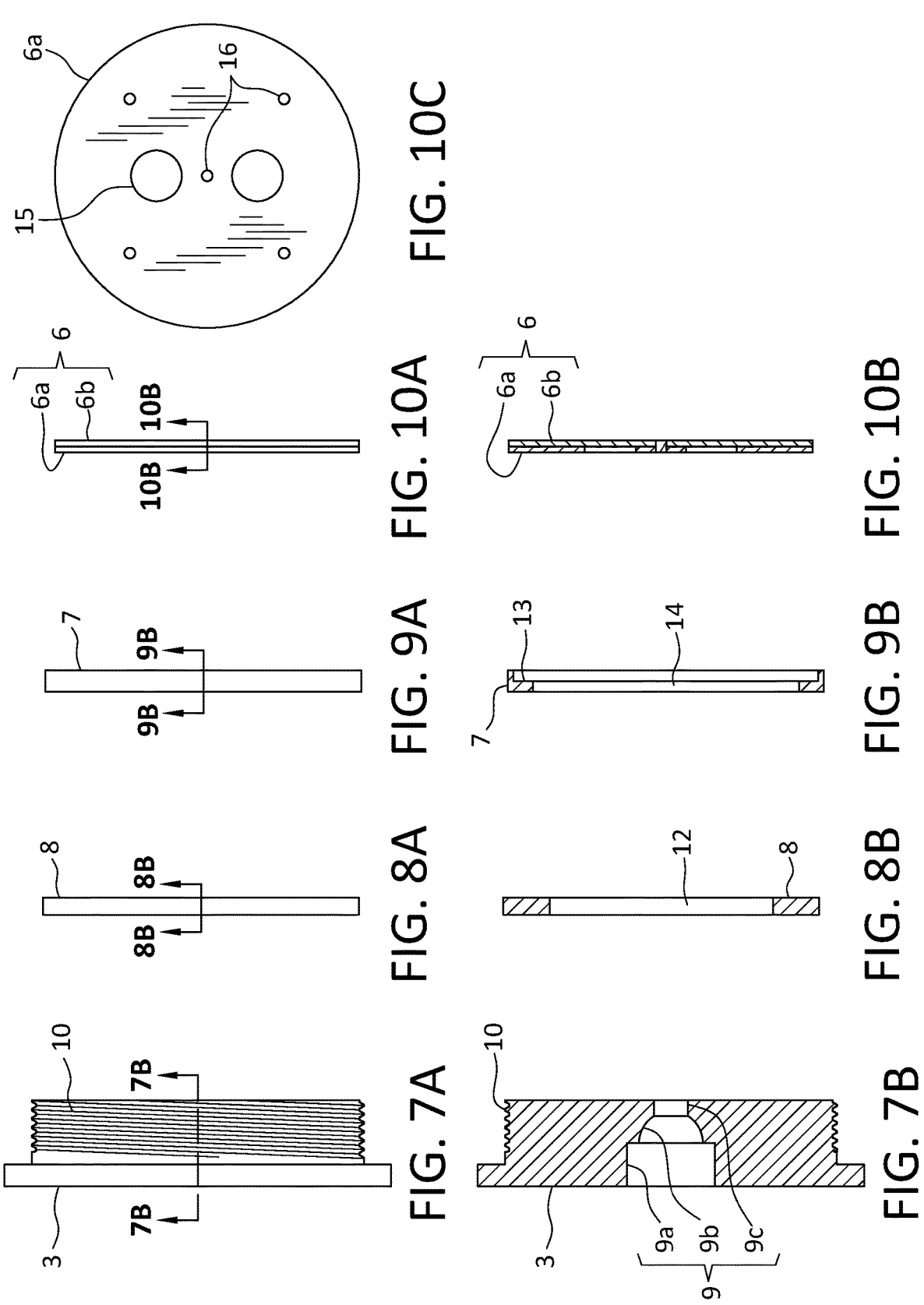
FIGS. 7A and 7B illustrate an outer cap for use in the crucible of FIG. 1.
FIGS. 8A and 8B illustrate a ring of compressible carbon fiber felt for use in the crucible of FIG. 1.
FIGS. 9A and 9B illustrate a graphite ring for use in the crucible of FIG. 1.
FIGS. 10A to 10D illustrate a first embodiment of an inner cap for use in the crucible of FIG. 1.

FIGS. 7A and 7B show outer cap 3, for use in the crucible 1 of FIG. 1. As seen in FIG. 7A, outer cap 3 includes a helical male thread 10 on an outer surface thereof. FIG. 7B is a cross section of the outer cap 3, viewed in the direction of arrows F of FIG. 7A. As seen in FIG. 7B, an axial socket 9 runs through the center of outer cap 3. At an outer surface of outer cap 3, a polygonal outer socket 9a, which may be triangular, square, pentagonal, or hexagonal, is formed. At an inner surface of outer cap 3, a hole 9c, which may be cylindrical or polygonal, is formed. Hole 9c and outer socket 9a are in fluid communication with each other, either directly or through an inner socket portion 9b. Inner socket portion 9b, if present, has a hemispherical surface connecting hole 9c to outer socket portion 9a.

FIGS. 8A and 8B show a ring or disc 8 of compressible carbon fiber felt or graphite mesh, for use in the crucible 1 of FIG. 1. FIG. 8B is a cross section of the felt or mesh 8, viewed in the direction of arrows H of FIG. 8A. As seen in FIG. 8B, the felt or mesh ring or disc 8 may be a ring with a hole 12 therethrough. In various embodiments, the felt or mesh ring or disc 8 may be a continuous disc lacking hole 12, as long as the felt or mesh ring or disc 8 is permeable to gases.

FIGS. 9A and 9B show graphite ring 7, for use in the crucible 1 of FIG. 1. FIG. 9B is a cross section of the graphite ring 7, viewed in the direction of arrows G of FIG. 9A. As seen in FIG. 9B, the graphite ring 7 includes a seat 13 on its inner side, and a hole 14 therethrough.

Figure 10D:
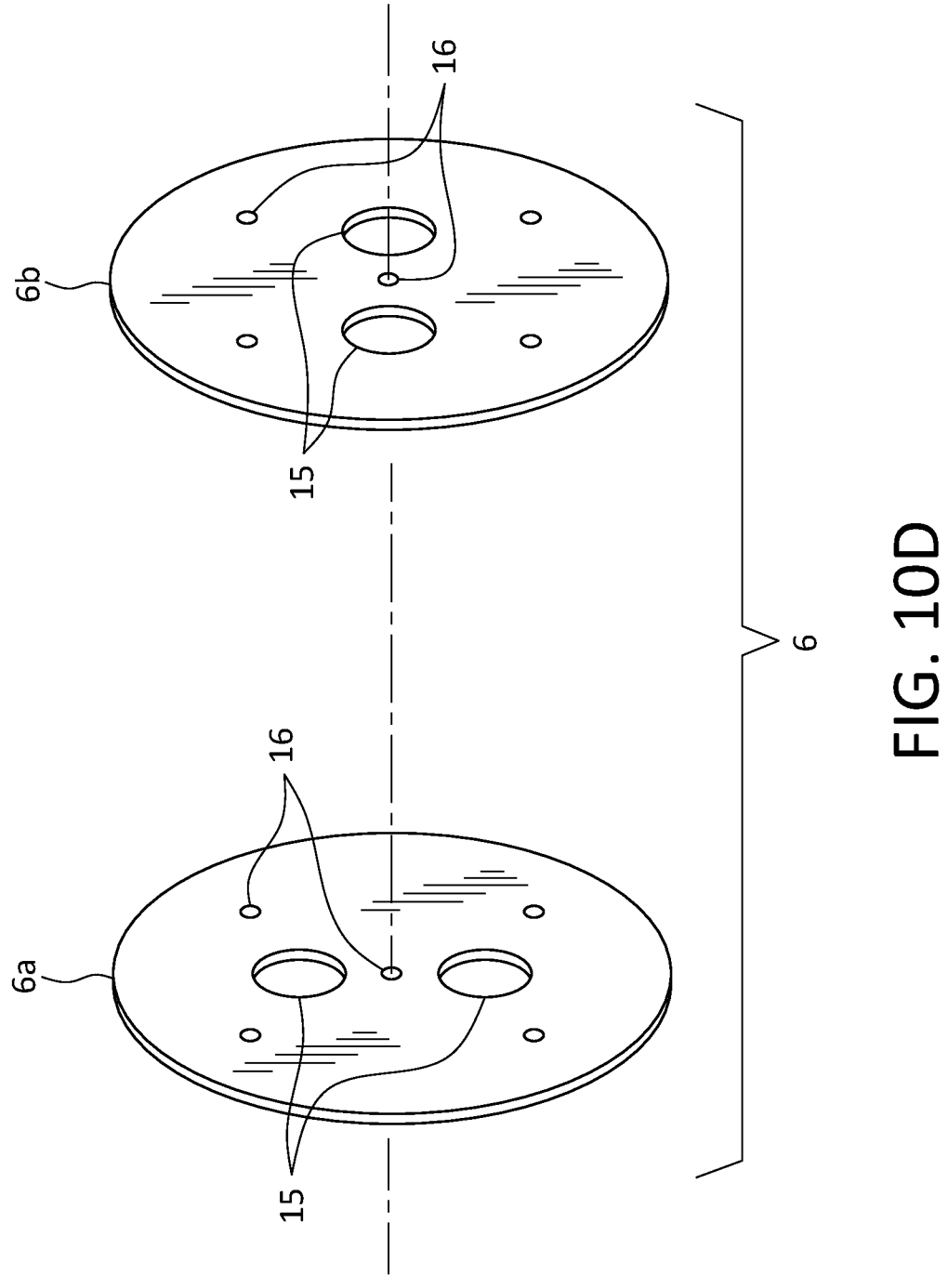

FIGS. 10A and 10B show inner cap 6, for use in the crucible 1 of FIG. 1. FIG. 10B is a cross section of the inner cap 6, viewed in the direction of arrows J of FIG. 10A. As seen in FIGS. 10A and 10BB, the inner cap 6 is formed from two metal plates, an outer plate 6a and an inner plate 6b. As seen in FIG. 10C, outer plate 6a includes two large holes 15, symmetrically disposed on opposite sides of the geometric center of plate 6a. A plurality of small, vapor-permeable openings 16 pass through plate 6a, where the openings 16 may be arranged at the vertices of a regular polygon with an even number of sides. As seen in FIG. 10C, the openings 16 may be arranged at the vertices of a square. Another opening 16 may be arranged at the geometric center of plate 6a. The structure of plate 6b is identical to that of plate 6a. As seen in FIG. 10D, plates 6a and 6b are assembled so that holes 16 on plate 6a align with holes 16 on plate 6b. Plates 6a and 6b are assembled so that large holes 15 on plate 6a are offset from large holes 15 on plate 6b. If holes 16 are positioned at the vertices of a square, large holes 15 on plate 6a are offset from large holes 15 on plate 6b by 180°. If holes 16 are positioned at the vertices of a regular hexagon, for example, large holes 15 on plate 6a may be offset from with large holes 15 on plate 6b by 120°, so as to allow holes 16 on plates 16a and 16b to align. Plates 6a and 6b are each from 0.5 mm to 2.5 mm thick, or about 1.25 mm to 1.75 mm thick. Plates 6a and 6b are made from molybdenum, tungsten, or an alloy thereof. Plates 6a and 6b may be made from TZM alloy. In various embodiments, holes 16 are smaller than the mean particle size of the metal oxide gel particles to be sintered in crucible 1, smaller than 67% of the mean particle size of the metal oxide gel particles, or smaller than 50% of the mean particle size of the metal oxide gel particles. This prevents the particles from escaping the sealed crucible, while allowing vapors to escape the crucible.

Returning to FIG. 2B, each open end of the housing 2 is closed by placing an inner surface of inner cap 6 against a rim of sleeve 11, within seat 4 on the inner surface of tubular housing 2. Graphite ring 7 is placed over an outer surface of inner cap 6, with an edge of inner cap 6 fitting within seat 13 (shown in FIG. 9B) of graphite ring 7. Ring or disc 8 of compressible carbon fiber felt or graphite mesh is placed against an outer surface of graphite ring 6. The threaded outer surface 10 of outer cap 3 is screwed onto the end of the tubular housing 2, so that threaded outer surface 10 engages helical threading 5 on the inner surface of tubular housing 2. Outer cap 3 is screwed onto housing 2, compressing ring or disc 8 against graphite ring 7 and holding inner cap 3 against tubular sleeve 11. If the tubular housing 2 and sleeve 11 have a single open end, sleeve 11 may be filled with metal oxide gel particles, and then the open end of tubular housing 2 and sleeve 11 may be closed as shown in FIG. 2B. If the tubular housing 2 and sleeve 11 have two open ends, one open end of tubular housing 2 and sleeve 11 may be closed as shown in FIG. 2B. Sleeve 11 may then be filled with metal oxide gel particles, and then the other open end of tubular housing 2 and sleeve 11 may be closed. Once each open end of tubular housing 2 and sleeve 11 are closed, metal oxide gel particles are exposed to the metal or metal alloy surfaces of sleeve 11 and inner cap 6, and do not contact any graphite parts of crucible 1.

FIGS. 11A and 11B show an alternate embodiment of inner cap 6, for use in the crucible 1 of FIG. 1. As seen in FIG. 11A, the inner cap 6 is formed from a single metal plate 17. Plate 17 includes a plurality of small, vapor-permeable openings 18 passing through plate 17, where the openings 18 may be arranged in radial lines extending from the geometric center of plate 17, as shown in FIG. 11A. Alternatively, openings 18 may be arranged in a plurality of concentric circles, or openings 18 may be arranged randomly across plate 17. Plate 17 is from 1.5 mm to 4 mm thick, about 2.5 mm to 3.5 mm thick, or about 3 mm thick. Plate 17 is made from molybdenum, tungsten, or TZM alloy. In various embodiments, holes 18 are smaller than the mean particle size of the metal oxide gel particles to be sintered in crucible 1, smaller than 67% of the mean particle size of the metal oxide gel particles, smaller than 50% of the mean particle size of the metal oxide gel particles, or from 0.5 mm to 0.15 mm in diameter. This prevents the particles from escaping the sealed crucible, while allowing vapors to escape the crucible.

FIGS. 12A and 12B show an alternate embodiment of inner cap 6, for use in the crucible 1 of FIG. 1. As seen in FIG. 12A, the inner cap 6 is formed from a single metal plate 19. Plate 17 includes a plurality of narrow, vapor-permeable slits 20 passing through plate 17, where the slits 20 may be arranged in parallel lines extending across plate 19, as shown in FIG. 12A. Plate 19 is from 1.5 mm to 4 mm thick, about 2.5 mm to 3.5 mm thick, or about 3 mm thick. Plate 19 is made from molybdenum, tungsten, or TZM alloy. In various embodiments, slits 20 are narrower than the mean particle diameter of the metal oxide gel particles to be sintered in crucible 1, narrower than 67% of the mean particle diameter of the metal oxide gel particles, narrower than 50% of the mean particle diameter of the metal oxide gel particles, or from 0.5 mm to 0.15 mm in width. This prevents the particles from escaping the sealed crucible, while allowing vapors to escape the crucible.

Once the crucible is filled with metal oxide gel particles, the crucible is heated to an effective sintering temperature, and the metal oxide gel particles are converted to ceramic particles. The inner sleeve 11 and the inner caps 6 prevent the metal oxide gel particles and/or the ceramic particles from contacting the graphite housing or the outer cap 3. The molybdenum, tungsten, or TZM alloy sleeve 11 and inner caps 6 are stable with regard to the metal oxide gel particles and/or the ceramic particles, and do not react with the metal oxide gel at temperatures up to 2000° C. Without the alloy sleeve 11 and inner caps 6, the graphite housing would react with the metal oxide gel, carburizing the metal oxide gel particles.

In various embodiments, the crucible 1 may be positioned so that the longitudinal axis lies in a horizontal direction, as shown in FIG. 1. The crucible may rotate about its longitudinal axis, thereby mixing metal oxide gel particles within the tubular sleeve 11 and ensuring even heating as the metal oxide gel particles are converted into solid ceramic particles. The tubular housing may be supported on rotary bearings (not shown) or a similar support which allows rotational motion of the housing 2. Rotation of the crucible 1 may be driven by a rotary shaft driven by a motor (not shown), which engages the outer cap 9 of crucible 1.

Figure 13:
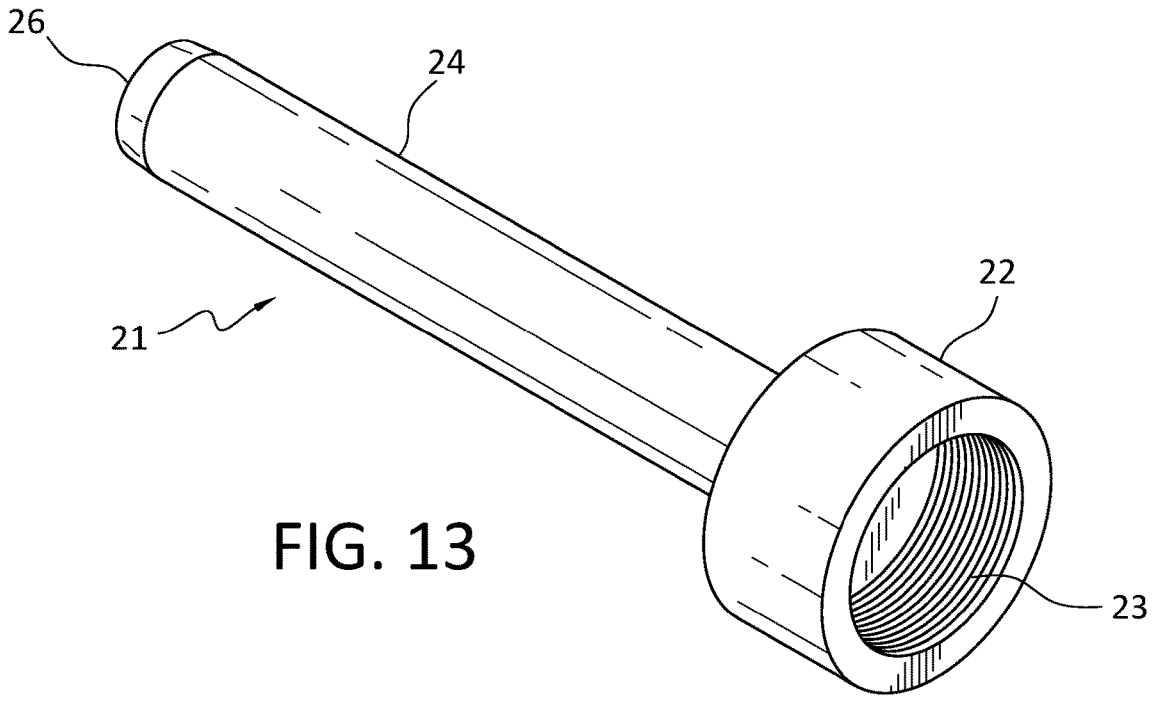
FIGS. 13 and 14 illustrate a first portion of a rotatable drive shaft.
Figure 14:
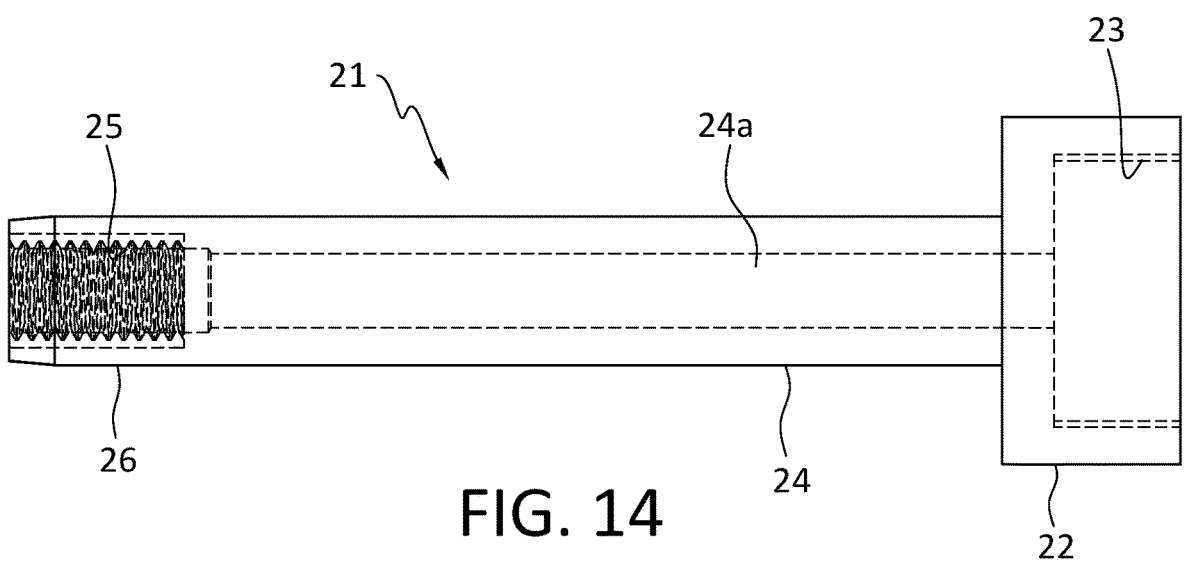

FIGS. 13 and 14 show a first section 21 of a rotary shaft, which may be made of tungsten, molybdenum, or TMZ alloy. First section 21 includes a tubular shaft 24 with an axial bore 24*a* therethrough. A first end of the shaft 24 includes an enlarged socket 22, with a female thread 23 on an internal surface of socket 22. A second end of the shaft 24 includes a socket 26, with a female thread 25 on an internal surface of socket 26. The female thread 25 on socket 26 is configured to engage a threaded end of a shaft driven by a motor. The female thread 23 on socket 22 is configured to engage a second section 27 of a rotary shaft, shown in FIG. 15.

Figure 15:
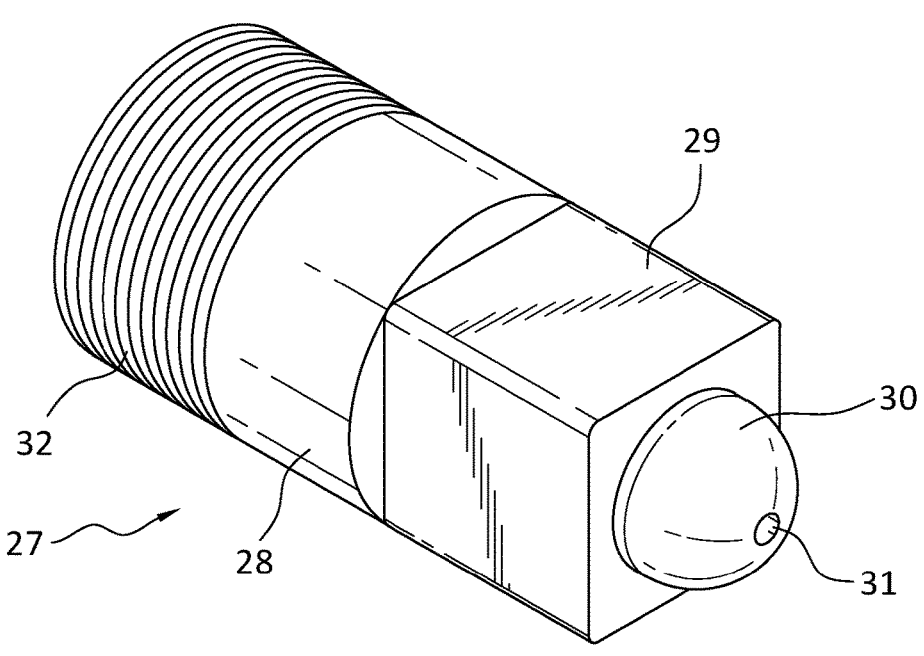
FIGS. 15 and 16 illustrate a second portion of a rotatable drive shaft.
Figure 16:
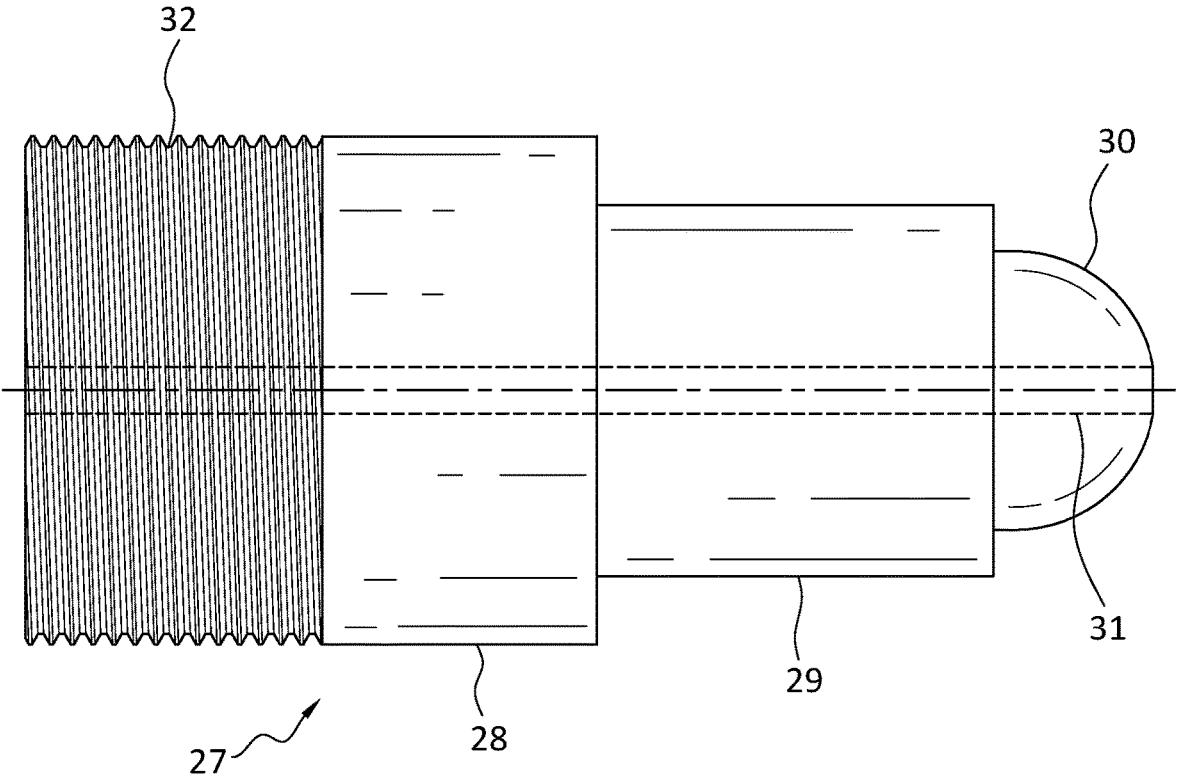

FIGS. 15 and 16 show a second section 27 of a rotary shaft, which may be made of graphite, tungsten, molybdenum, or TMZ alloy. Second section 27 includes a shaft 28. A first end of the shaft 28 includes a male thread 32 on an external surface of shaft 28. A second end of the shaft 28 includes a polygonal projection 29, which may be milled into an outer surface of shaft 28. As shown in FIG. 15, polygonal projection 29 may be square. Alternatively, polygonal projection 29 may be triangular, pentagonal, or hexagonal. The second end of the shaft 28 also includes a hemispherical projection 30, which may be milled into an outer surface of polygonal projection 29. The male thread 32 is configured to engage female thread 23 on socket 22 on first section 21 of the rotary shaft. The projections 29 and 30 on second section 27 of the rotary shaft are configured to engage the outer cap 3 of crucible 1, shown in FIG. 17. Second section 27 of the rotary shaft includes an axial bore 31 therethrough. When male thread 32 engages female thread 23 on socket 22, axial bores 31 and 24*a* are in fluid communication with each other.

If desired, first section 21 and second section 27 of the rotary shaft may be formed as a single piece, which may be made of graphite, tungsten, molybdenum, or TMZ alloy.

Figure 17:
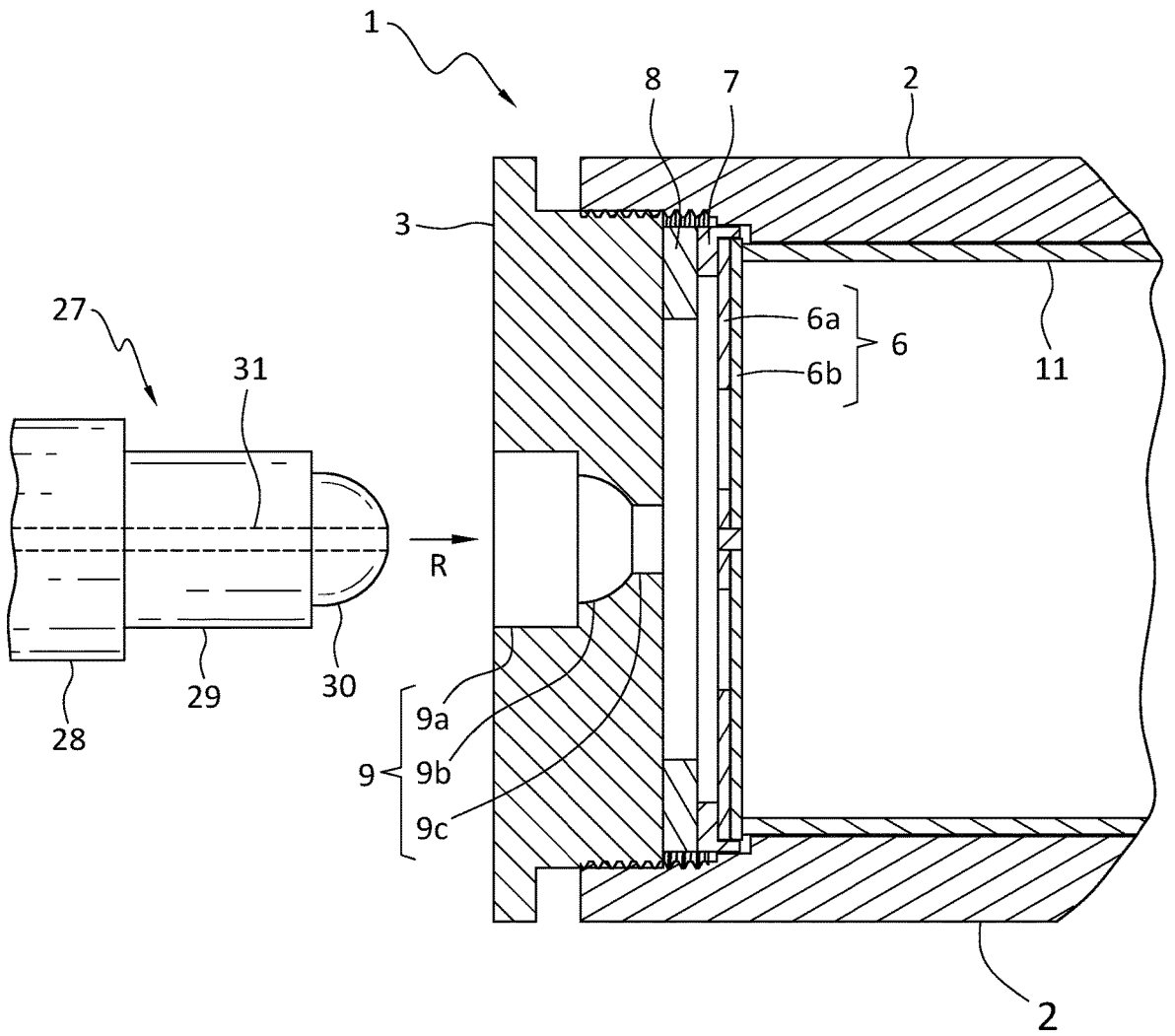
FIG. 17 illustrates engagement between the second portion of the rotatable drive shaft of FIG. 15 and the outer cap of FIG. 7B.

Referring to FIG. 17, an axial socket 9 runs through the center of outer cap 3 of crucible 1. At an outer surface of outer cap 3, a polygonal outer socket 9*a* is formed. Polygonal outer socket 9*a* is configured to engage polygonal projection 29 of section 27 of the rotary shaft. Inner socket portion 9*b* has a hemispherical surface, and is configured to engage hemispherical projection 30 of section 27 of the rotary shaft. At an inner surface of outer cap 3, a hole 9*c* is formed. Hole 9*c* and axial bore 31 of section 27 of the rotary shaft are in fluid communication with each other, allowing a path for gases to escape crucible 1. Rotation of the rotary shaft causes polygonal projection 29 to transmit torque to the polygonal outer socket 9*a* of outer cap 3, causing crucible 1 to rotate about its longitudinal axis.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A crucible for forming ceramic particles from metal oxide gel particles, comprising:
   a tubular housing formed of graphite having at least one open end, an inner surface, and a seat in the inner surface near the at least one open end;
   a sleeve lining the inner surface of the tubular housing, wherein the sleeve has at least one open end and is formed from a metal which is chemically inert with regard to the metal oxide gel particles;
   a graphite outer cap removably covering the at least one open end of the tubular housing; and
   an inner cap formed from the chemically inert metal;
   wherein:
      the inner cap is configured to fit into the seat in the inner surface of the tubular housing; and
      the outer cap is configured to press the inner cap into the seat against the open end of the sleeve.

2. The crucible of claim 1, wherein the inner cap and the outer cap are configured to allow gases to escape from within the crucible.

3. The crucible of claim 2, wherein:
   the inner cap is configured to allow gases to pass therethrough; and
   the outer cap comprises an axial hole therethrough.

4. The crucible of claim 3, wherein the inner cap comprises at least one hole therethrough, the at least one hole being smaller than 50% of the mean particle size of the metal oxide gel particles.

5. The crucible of claim 3, wherein the inner cap comprises at least one slit therethrough, the width of the at least one slit being smaller than 50% of the mean particle size of the metal oxide gel particles.

6. The crucible of claim 1, further comprising a compressible carbon fiber felt, wherein the compressible carbon fiber felt is configured to be compressed against the inner cap by the outer cap.

7. The crucible of claim 1, further comprising a graphite ring with an outer seat, wherein the outer seat is configured to engage an edge of the inner cap, and the graphite ring is configured to be pressed against the edge of the inner cap by the outer cap.

8. The crucible of claim 7, further comprising a ring of compressible carbon fiber felt, wherein the ring of compressible carbon fiber felt is configured to be compressed against the graphite ring by the outer cap.

9. The crucible of claim 1, wherein:
the crucible is configured to rotate about an axis thereof;
the crucible further comprises a rotatable drive shaft; and
the rotatable drive shaft is configured to engage the outer cap.

10. The crucible of claim 9, wherein:
the rotatable drive shaft comprises a polygonal end; and
the outer cap comprises a polygonal socket configured to engage the polygonal end of the rotatable drive shaft.

11. The crucible of claim 10, wherein:
the rotatable drive shaft comprises a bore therethrough; and
the outer cap comprises a hole therethrough;
wherein the bore in the rotatable drive shaft and the hole in the outer cap are configured to provide a pathway to allow gases to escape from within the crucible.

12. The crucible of claim 9, wherein:
the rotatable drive shaft comprises a polygonal end, and a hemispherical ball extending from the polygonal end of the rotatable drive shaft; and
the outer cap comprises a socket configured to receive the end of the rotatable drive shaft, wherein the socket comprises:
an inner hemispherical socket configured to engage the hemispherical ball of the rotatable drive shaft; and
an outer polygonal socket configured to engage the polygonal end of the rotatable drive shaft.

13. The crucible of claim 12, wherein:
the rotatable drive shaft comprises a bore therethrough; and
the outer cap comprises a hole therethrough;

wherein the bore in the rotatable drive shaft and the hole in the outer cap are configured to provide a pathway to allow gases to escape from within the crucible.

14. A crucible for forming ceramic uranium-containing particles from uranium oxide gel particles, comprising:
a tubular housing formed of graphite having at least one open end, an inner surface, and a seat in the inner surface near the at least one open end;
a sleeve lining the inner surface of the tubular housing, wherein the sleeve has at least one open end and is formed from molybdenum or an alloy thereof;
an outer cap removably covering the at least one open end of the tubular housing; and
an inner cap formed from molybdenum or an alloy thereof;
wherein:
the inner cap is configured to fit into the seat in the inner surface of the tubular housing; and
the outer cap is configured to press the inner cap into the seat against the open end of the sleeve.

15. The crucible of claim 14, wherein the sleeve and the inner cap are formed from a molybdenum alloy comprising at least one of 0.5% titanium, 0.08% zirconium, and 0.02% carbon.

16. The crucible of claim 14, wherein the sleeve and the inner cap are formed from a molybdenum alloy comprising 0.5% titanium, 0.08% zirconium, and 0.02% carbon.

17. A crucible for forming ceramic uranium- containing particles from uranium oxide gel particles, comprising:
a tubular housing formed of graphite having at least one open end, an inner surface, and a seat in the inner surface near the at least one open end;
a sleeve lining the inner surface of the tubular housing, wherein the sleeve has at least one open end;
an outer cap removably covering the at least one open end of the tubular housing; and
an inner cap;
wherein:
the inner cap is configured to fit into the seat in the inner surface of the tubular housing; and
the outer cap is configured to press the inner cap into the seat against the open end of the sleeve; and
wherein the sleeve and the inner cap are formed from molybdenum, a molybdenum alloy, tungsten, or a tungsten alloy.

* * * * *